(12) United States Patent
Fischer et al.

(10) Patent No.: US 8,786,491 B2
(45) Date of Patent: Jul. 22, 2014

(54) METHODS AND APPARATUSES FOR REQUESTING/PROVIDING ASSISTANCE DATA ASSOCIATED WITH VARIOUS SATELLITE POSITIONING SYSTEMS IN WIRELESS COMMUNICATION NETWORKS

(75) Inventors: Sven Fischer, Nuremberg (DE); Ie-Hong Lin, Cupertino, CA (US); Kirk Allan Burroughs, Alamo, CA (US); Grant Alexander Marshall, Campbell, CA (US); Stephen W. Edge, Escondido, CA (US)

(73) Assignee: QUALCOMM Incorporated, San Diego, CA (US)

(*) Notice: Subject to any disclaimer, the term of this patent is extended or adjusted under 35 U.S.C. 154(b) by 657 days.

(21) Appl. No.: 12/417,553

(22) Filed: Apr. 2, 2009

(65) Prior Publication Data

US 2010/0013701 A1 Jan. 21, 2010

Related U.S. Application Data

(60) Provisional application No. 61/081,985, filed on Jul. 18, 2008, provisional application No. 61/083,080, filed on Jul. 23, 2008, provisional application No. 61/088,590, filed on Aug. 13, 2008, provisional application No. 61/091,695, filed on Aug. 25, 2008.

(51) Int. Cl.
*G01S 19/06* (2010.01)
*G01S 19/05* (2010.01)

(52) U.S. Cl.
USPC .................. 342/357.43; 342/357.42

(58) Field of Classification Search
USPC ............ 342/357.21, 357.42, 357.43, 357.64; 701/207, 213, 468, 470
See application file for complete search history.

(56) References Cited

U.S. PATENT DOCUMENTS

| | | | |
|---|---|---|---|
| 7,495,608 B1 * | 2/2009 | Chen et al. | 342/357.43 |
| 7,668,554 B2 * | 2/2010 | Chang | 455/456.2 |
| 7,683,831 B2 | 3/2010 | Fischer | |
| 2005/0052318 A1 * | 3/2005 | Jendbro et al. | 342/357.1 |

FOREIGN PATENT DOCUMENTS

| | | |
|---|---|---|
| CN | 1886672 A | 12/2006 |
| GB | 2358976 A | 8/2001 |
| JP | 2004061336 A | 2/2004 |
| JP | 2004529032 A | 9/2004 |
| JP | 2009515156 A | 4/2009 |
| JP | 2009523247 A | 6/2009 |
| RU | 2297715 C2 | 4/2007 |
| TW | 200708053 A | 2/2007 |
| WO | WO02067462 A1 | 8/2002 |
| WO | WO2007054493 A1 | 5/2007 |
| WO | WO2007082038 A1 | 7/2007 |
| WO | WO2008053308 A2 | 5/2008 |

OTHER PUBLICATIONS

3GPP2 C.S0022-0, Version 1.0, (TIA:IS-801), "Location Services (Position Determination Service)," Dec. 1999.

(Continued)

*Primary Examiner* — Dao Phan
(74) *Attorney, Agent, or Firm* — Thien T. Nguyen

(57) ABSTRACT

Methods and apparatuses are provided for use by devices within in wireless communication network to request and/or provide assistance data and/or other like data associated with various Satellite Positioning Systems (SPSs).

40 Claims, 5 Drawing Sheets

(56) References Cited

OTHER PUBLICATIONS

3GPP2 C.S0022-0, Version 3.0, (TIA:IS-801-1), "Position Determination Service Standard for Dual Mode Spread Spectrum Systems," Feb. 2001.

3GPP2 C.S0022-A, Version 1.0, (TIA:IS-801-A), "Position Determination Service for cdma2000 Spread Spectrum Systems," Mar. 2004.

3GPP2 C.S0022-B, Version 1.0, (TIA:IS-801-B), "Position Determination Service for cdma2000 Spread Spectrum Systems," Feb. 2009.

3GPP TS 149.031, Digital cellular telecommunications system (Phase 2+); Location Services (LCS); Base Station System Application Part LCS Extension (BSSAP-LE), 3GPP TS 49.031 version 7.6.0 Release 7, Apr. 2008, 53 pages.

ETSI TS 144 031 V7.9.0, Digital cellular telecommunications system (Phase 2+); Location Services (LCS); Mobile Station (MS)—Serving Mobile Location Centre (SMLC); Radio Resource LCS Protocol (RRLP), 3GPP TS 144.031 version 7.9.0 Release 7, Jul. 2008, pp. 1-125.

International Search Report and Written Opinion—PCT/US2009/045179, International Search Authority—European Patent Office—Aug. 14, 2008.

Nokia, "Comments on GP-060785 and GP-060786", 3GPP TSG GERAN#29, TDoc GP-060829, San Jose del Cabo, Mexico, Apr. 24-28, 2006.

QUALCOMM, "Introduction of GANSS Almanac Corrections", 3GPP TSG-GERAN Meeting #35, Dublin, Ireland, GP-071302, Aug. 27-31, 2007, Ver. 7.3.0, 6 pages.

Meeting #36, GP-071985, Vancouver, BC, Nov. 12-16, 2007-11-07, rev 5, version: 7.6.0.

SiRF Technology, et al., "Ephemeris Extension for GANSS", 3GPP TSG-GERAN2 Meeting #36, GP-071985, Vancouver, BC, Nov. 12-16, 2007-11-07, rev 5, version: 7.6.0.

Karunanayake D., et.al., "Evaluation of Assisted GPS (AGPS) in Weak Signal Environments Using a Hardware Simulator", ION GNSS 2004 Conference, Long Beach, CA, Sep. 21-24, 2004.

ETSI TS 144 031 V7.8.0, "Digital cellular telecommunications system (Phase 2+); Location Services (LCS); Mobile Station (MS)—Serving Mobile Location Centre (SMLC); Radio Resource LCS Protocol (RRLP), 3GPP TS 44.031 version 7.8.0 Release 7", Apr. 2008.

Taiwan Search Report—TW098123434—TIPO—Mar. 12, 2013.

\* cited by examiner

METHODS AND APPARATUSES FOR REQUESTING/PROVIDING ASSISTANCE DATA ASSOCIATED WITH VARIOUS SATELLITE POSITIONING SYSTEMS IN WIRELESS COMMUNICATION NETWORKS

RELATED APPLICATIONS

This patent application claims benefit of and priority to U.S. Provisional Patent Application 61/081,985, filed Jul. 18, 2008, and titled "Provision of Ephemeris and Almanac Data for Assisted-GNSS Location Protocols", and which is assigned to the assignee hereof and which is expressly incorporated herein by reference.

This patent application claims benefit of and priority to U.S. Provisional Patent Application 61/083,080, filed Jul. 23, 2008, and titled "Support for Additional Navigation Satellite Systems in Existing Location Protocols", and which is assigned to the assignee hereof and which is expressly incorporated herein by reference.

This patent application claims benefit of and priority to U.S. Provisional Patent Application 61/088,590, filed Aug. 13, 2008, and titled "Support for Additional Navigation Satellite Systems in Existing Location Protocols", and which is assigned to the assignee hereof and which is expressly incorporated herein by reference.

This patent application claims benefit of and priority to U.S. Provisional Patent Application 61/091,695, filed Aug. 25, 2008, and titled "GNSS Request/Response Elements for IS-801-B", and which is assigned to the assignee hereof and which is expressly incorporated herein by reference.

BACKGROUND

1. Field

The subject matter disclosed herein relates to wireless communication networks and devices and more particularly to methods and apparatuses for use by devices within in wireless communication network to request and/or provide assistance data and/or other like data associated with various Satellite Positioning Systems (SPSs).

2. Information

Position determination processes may be used to estimate or otherwise determine a location of a device associated with a wireless communication network. In a particular example, a position determination process may be implemented to estimate location coordinates for a mobile device such as a cellular telephone or other like mobile station. There are a variety of techniques available to support position determination processes. For example, a Satellite Positioning System (SPS) such as the Global Positioning System (GPS) and/or other like systems may be used to estimate the location of a mobile station. In the context of a wireless communication network, certain position determination processes may require that information and/or processing tasks be shared and/or distributed between multiple devices. For example, in certain instances a mobile station may be assisted in some manner by one or more other devices as part of a position determination process. As a result, there is often a need for such devices to communicate in some manner, for example, via one or more position determination communication sessions over a wireless link. Thus, one or more positioning protocols may be developed to enable such position determination communication sessions and as such support position determination processes.

SUMMARY

In accordance with one aspect, a method and/or apparatus may be provided for use with a mobile station within a wireless communication network. The method and/or apparatus may identify assistance data associated with a Satellite Positioning System (SPS) that is used by the mobile station to support a position determination process based, at least in part, on received SPS signals. The method and/or apparatus may transmit or initiate transmission of signals representing at least one message over a wireless communication link to at least one network resource, wherein the message includes at least one element identifying the assistance data and a specific format of the assistance data if the assistance data is available in different formats. For example, a specific format of the assistance data may include a native format or a non-native format.

In accordance with another aspect, a method and/or apparatus may be provided for use with a network resource within a wireless communication network. The method and/or apparatus may receive signals representing at least one message as transmitted over a wireless communication link from a mobile station, wherein the message includes at least one element identifying assistance data associated with a SPS and identifying a specific format of the assistance data if the assistance data is available in different formats. The method and/or apparatus may provide the assistance data via signals representing one or more messages transmitted over a wireless communication link to the mobile station, wherein the assistance data may be associated with the SPS and if identified in the received message the assistance data may be provided in the specific format. For example, a specific format of the assistance data may include a native format or a non-native format.

In certain example implementations, an SPS may include, for example, at least one Global Navigation Satellite System (GNSS), such as, Galileo, GLONASS, Satellite Based Augmentation System (SBAS), Quasi-Zenith Satellite System (QZSS), modernized Global Positioning System (GPS), and/or or the like. In certain example implementations, the assistance data may include ephemeris data, almanac data, model data, timing data, health data, and/or other like data that may be associated with an SPS.

DETAILED DESCRIPTION

Figure 1:
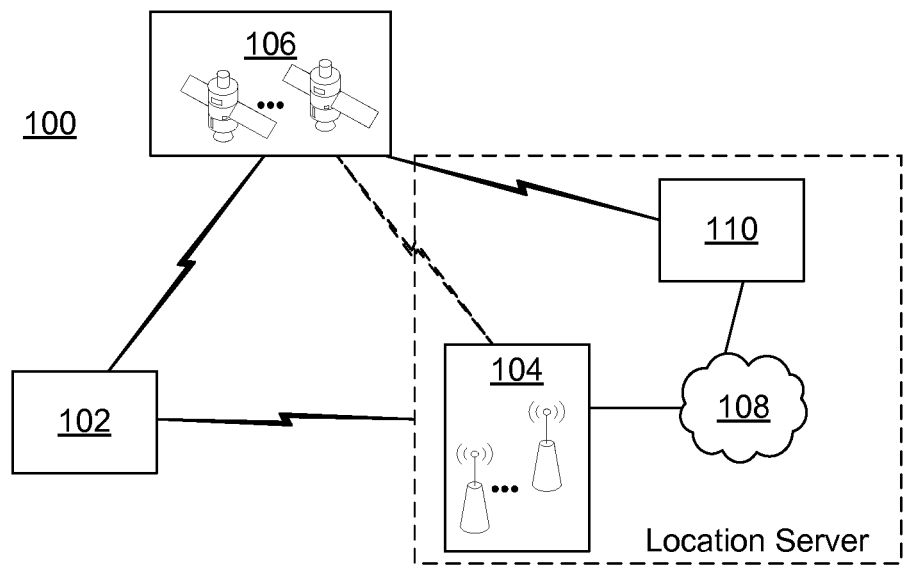
FIG. 1 is a schematic block diagram illustrating an example wireless communication network environment within which at least two devices may be enabled to communicate with one another and initiate and/or otherwise support a position determination process, in accordance with an implementation.

Non-limiting and non-exhaustive aspects are described with reference to the following figures, wherein like reference numerals refer to like parts throughout the various figures unless otherwise specified.

Position determination processes may be used to estimate or otherwise determine a location of a device and in particular examples the location of a mobile device such as a mobile station. There are a variety of techniques available to support position determination processes. In the context of a wireless communication network, certain position determination processes may require that information and/or processing tasks be distributed between and/or among multiple devices. For example, in certain instances a mobile station may be assisted in some manner by one or more other devices as part of a position determination process. As a result, there may be a need for such devices to communicate in some manner, for example, via one or more communication sessions, e.g., "position determination communication sessions" (e.g., which may support assistance data delivery, position request/response sessions, and/or other like processes) over a wireless link. One or more positioning protocols may be developed to enable such position determination communication sessions for supporting various position determination processes. Such positioning protocols may provide for assistance data, for example as received by one or more devices within a network from a Satellite Positioning Systems (SPS), to be requested by a mobile station and to be provided to the mobile station. Such positioning protocols may also provide positioning instructions to a mobile station, e.g., quality of service parameters such as desired location accuracy or response time, allowed or desired positioning systems if a mobile station supports more than one positioning system such as more than one SPS.

Thus, in accordance with certain aspects of the present description, method and apparatuses may be provided for use in a mobile station within a wireless communication network. A mobile station may, for example, be enabled to request assistance data associated with one or more SPS from other resources in a wireless communication network, such as, a base station, a location server (e.g., a Position Determination Entity (PDE), a Serving Mobile Location center (SMLC), a Gateway Mobile Location Center (GMLC), a Standalone SLMC (SAS), a Secure User Plane Location Platform (SUPL SLP)), and/or the like.

Thus, in accordance with an exemplary positioning protocol version, a mobile station may be enabled to request assistance data associated with one or more SPS within at least one message (e.g., a Position Determination Data Message (PDDM), and/or the like) that is transmitted to at least one network resource. Conversely, for example, a base station and/or the like may be enabled to provide assistance data associated with one or more SPS within at least one message that is transmitted to the mobile station. Here, for example, a message may include at least one element (e.g., a request element, a response element, etc.) identifying in some manner assistance data that is being requested and/or provided, and (optionally) a specific format of the assistance data should the assistance data be available in different formats.

In accordance with another exemplary positioning protocol version, a mobile station may be enabled to request assistance data associated with one or more SPS within a Measure Position Response Message, if assistance data provided in a corresponding Measure Position Request Message are not sufficient for the mobile station to perform the requested location measurements, or the provided assistance data are not in a format desired or supported by the mobile station.

For example, in certain implementations, various particular types of PDDMs or assistance data information elements (IEs) may be defined and associated with a various types of SPS and/or related associated assistance data. Further, as applicable, certain particular types of PDDM or assistance data information elements may include at least one data field that identifies in some manner the specific format of the assistance data that is being requested or provided. For brevity purposes within this detailed description, while the term "PDDM" is used often it should be recognized that any applicable message or messages (e.g., such as assistance data information element(s), and/or the like) may be employed. Thus, unless otherwise specifically recited, messages and/or signal transmissions presented in claimed subject matter is not intended to be limited to PDDM(s) type messages/signals.

In other example implementations, one or more "generic" type(s) of PDDM or assistance data information elements or data fields within a PDDM or assistance data information element may be defined that may be selectively associated with one of a plurality of different SPS and/or associated assistance data. For example, a single PDDM or assistance data information element may be defined and selectively associated in some manner with either a first SPS or a second SPS, and/or a particular type of assistance data related with either a first SPS or a second SPS. For example, such a single PDDM or assistance data information element may include at least a first data field that identifies in some manner which SPS and/or related assistance data the PDDM or assistance data information element is associated with. The meaning and interpretation of data fields included in the PDDM or assistance data information element may, for example, be determined based at least in part on an identified SPS. For example, a "generic" satellite health information data field or the like may be defined whose meaning may be determined based on a data field that identifies a particular SPS. For example, a "generic" data field may be used which has a different specific meaning for each SPS, and therefore, treated accordingly (e.g., at a receiver) based on a data field which identifies the SPS. Further, as applicable, such a single PDDM or assistance data information element may include one or more other data fields that identify in some manner a specific format of the assistance data that is being requested or provided.

In certain example implementations, a mobile station may be enabled to indicate its support for various assistance data elements or formats to a network resource. Such process may be performed, for example, during registration in the network, wherein a mobile station reports its capabilities to relevant network entities or via certain capability exchange messages. By knowing the supported assistance data types or formats, if certain assistance data types are possible in different formats, allows a network resource (for example the PDE, SMLC, SLP, or the like) to provide only those assistance data elements or formats in a PDDM, position request or assistance data delivery message that a mobile station supports, if the mobile station does not support all specified or possible formats or format combinations for a particular SPS.

In certain example implementations, an SPS may include a Global Navigation Satellite System (GNSS), such as, Galileo, GLONASS, a Satellite Based Augmentation System (SBAS), Quasi-Zenith Satellite System (QZSS), a modernized Global Positioning System (GPS), and/or the like. SPS related assistance data may include, for example, ephemeris data, almanac data, various model data (e.g., relating to atmospheric conditions), timing data, health data (e.g., relating to satellite health), and/or other like data associated with a given SPS. Examples of other data associated with a given SPS include indications of ranging signals supported by a particular SPS satellite, if a particular SPS supports more than one signal, and the current SPS constellation consists of satellites supporting a variety of signals. Such information may also include an indication of signal frequency, if a SPS uses different frequencies for each satellite, for example a channel frequency number in case of GLONASS. Assistance data may, in certain example implementations, be provided in one or more native formats, a non-native format, and/or some other format, depending upon the SPS, the type of assistance data, mobile station, base station, location server, type of PDDM, a request element, a response element, etc.

A native format, for example, may be a navigation message data format that may be used and defined by an individual SPS and specified in the respective Interface Control Document (ICD) or Interface Specification (IS) of this SPS.

A non-native format, for example, may be a navigation message data format which may be defined by an individual SPS or other source and may be used for a SPS for which is not originally intended to be used for (for example, not defined in the ICD or IS of this SPS). Here, for example, an ephemeris data format defined by GPS and specified in a GPS ICD or IS but used for GLONASS may be considered as a non-native format for the GLONASS SPS.

The provision of non-native assistance data may have advantages in certain exemplary implementations to overcome the lack of certain native navigation data. For example, GLONASS navigation message data natively does not include parameters or elements to model the ionospheric electromagnetic wave propagation effects of the GLONASS signal. Other SPS like GPS, for example, provide natively ionospheric model data. Therefore, if for example the GPS ionospheric model parameter are provided to a GLONASS SPS receiver, the GLONASS receiver may make use of the ionospheric model parameters to adjust the GLONASS measurements for any ionospheric effects, e.g., by taking the different transmit frequency of the GLONASS signals compared to GPS signals into account.

In certain example implementations, an element within a PDDM may include a request element and/or a response element that is compliant and/or otherwise operative with Telecommunications Industry Association (TIA) "IS-801-B" positioning protocol standard and/or an associated Third-Generation Partnership Project 2 (3GPP2) positioning protocol standard.

In other example implementations, assistance data elements may be included in a Radio Resource LCS Protocol (RRLP) Measure Position Request or Assistance Data delivery message that is compliant and/or otherwise operative with an associated Third-Generation Partnership Project (3GPP) positioning protocol standard.

In other example implementations, assistance data elements may be included in a Radio Resource Control (RRC) Measurement Control Message or Assistance Data Delivery message that is compliant and/or otherwise operative with an associated Third-Generation Partnership Project (3GPP) protocol standard.

Positioning protocols have been developed and standardized for use in CDMA2000 and High Rate Packet Data (HRPD) wireless communication networks, for example. One example positioning protocol is often referred to by its standardization identity as "IS-801" in the TIA published standards (or "C.S0022" in 3GPP2 published standards).

Currently, there are two versions of this example positioning protocol. The first version is the initial version IS-801 version 1 (or C.S0022-0 version 3.0), which will simply be referred to herein as IS-801-1. The second version is IS-801 version A (or C.S0022-A version 1.0), which will simply be referred to herein as IS-801-A. It is expected that some form of IS-801-B will soon be finalized and identified in some manner by TIA and/or 3GPP2 (e.g., perhaps as IS-801 version B (or C.S0022-B version 1.0), and/or other like identifiers).

Positioning protocols have also been developed and standardized for use in Global System for Mobile Communications (GSM) networks, General Packet Radio Service (GPRS) networks, Enhanced Data Rates for GSM Evolution (EDGE) networks, or Universal Mobile Telecommunications System (UMTS) networks, for example. A positioning protocol standardized for use in afore mentioned networks is often referred to Radio Resource LCS Protocol (RRLP) or Radio Resource Control (RRC) protocol. For these protocol versions, several releases exist and the current available release is Release-7. It is expected that some form of Release-8 will soon be finalized by the Third-Generation Partnership Project.

There is some support for sharing GPS related assistance data in existing protocols, such as, IS-801-A, RRLP or RRC. Given the increasing availability of other SPS (e.g., GNSS) it is in accordance with certain aspects of the present description, that it may be beneficial to develop more advanced/robust positioning protocol versions, such as, IS-801-B, or new Releases of RRLP and RRC, and/or other positioning protocol versions which may support a plurality of different SPS related assistance data.

Compared to existing GPS related assistance data in existing location protocols, new SPS, such as Modernized GPS or Quasi-Zenith Satellite System (QZSS) or others may natively support the same or similar navigation message data in multiple formats. For example, as specified in an Interface Control Document (ICD) for Modernized GPS or QZSS, Almanac data provided by Modernized GPS or QZSS may be in Navigation (NAV) Almanac format, Midi Almanac format, or Reduced Almanac format. Similar, satellite ephemeris and clock correction data may be in NAV format, Civil Navigation (CNAV) format, or Civil Navigation-2 (CNAV-2) format. Similar, Universal Coordinated Time (UTC) model data may be in NAV format, Civil Navigation (CNAV) format, or Civil Navigation-2 (CNAV-2) format. Therefore, a request for example for ephemeris, almanac or other SPS related assistance data may not be unambiguous anymore, since there are various different native formats possible in which those information can be provided to a device in a response message within a certain positioning protocol.

Moreover, in accordance with certain aspects of the present description, with the availability of new SPS, there exists a possibility to provide assistance data in non-native formats. For example, if a device supports GPS and GLONASS, it may support assistance data formats native to GPS and GLONASS, but may also be enabled to support GPS specific formats for use in GLONASS (i.e., non-native to GLONASS).

In one aspect of the present description, a mobile station may be enabled to indicate which particular non-native formats or format combinations are supported for each SPS. Since with the increasing availability of new SPSs, many different new navigation message formats may be available, and therefore, many non-native combinations may be possible as well. Since a mobile station may not be able to support all possible combinations or formats, it is advantageous if a network resource (e.g., PDE, SMLC, SLP, or the like) knows a priori which formats may be supported by a mobile station for each SPS in order not to provide assistance data in a format which can not be used by the mobile station.

Moreover, it is also recognized that positioning protocol version negotiation processes may be employed within wireless networks, as needed, to allow various enabled devices to initiate and establish a position determination communication session over a communication channel/link and through which certain such potentially varying types of assistance data may be requested and/or provided in an efficient manner.

By way of example but not limitation, certain methods and apparatuses provided herein may use one or more PDDMs or the like which may be provided in one or more transport messages in a manner that not only supports IS-801-B, but also legacy and/or future versions. Further still, certain methods and apparatuses may be enabled to support location positioning processes in a variety of wireless communication networks, such as, e.g., an Ultra Mobile Broadband (UMB) network, a High Rate Packet Data (HRPD) network a CDMA2000 1X network, and/or the like.

In accordance with certain aspects of the present description various methods and apparatuses are provided which may be implemented in a first device that may be enabled to communicate with a second device to support a position determination process. By way of example but not limitation, the first and/or second devices may include a mobile station, or a specific apparatus, such as, a base station, a location server (e.g. a Position Determination Entity (PDE), Serving Mobile Location Center (SMLC), Gateway Mobile Location Center (GMLC), Standalone AGPS SMLC (SAS), SUPL Location Platform (SLP), etc.), and/or the like. For example, in certain implementations a mobile station and base station may be operatively enabled to communicate within a CDMA wireless communication network, and/or other applicable type of wireless communication network.

Methods and apparatuses may be implemented in such devices to allow the devices to utilize a position determination communication session associated with a position determination process. The position determination communication session may utilize a negotiated positioning protocol version, depending on the capabilities of the devices involved. Thus, the methods and apparatuses may be implemented to allow for different positioning protocol versions within a network. The methods and apparatuses may, for example, be enabled to allow for or otherwise support backward and/or forward compatibility between various positioning protocol versions within a network.

In the following detailed description, numerous specific details are set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

Attention is now drawn to FIG. 1, which is a schematic block diagram illustrating an example wireless communication network environment 100 within which devices may be enabled to communicate with one another and initiate and/or otherwise support a position determination process.

In this particular example, wireless communication network environment 100 includes representative devices such as a mobile station (MS) 102, one or more base stations (BS) 104, one or more Satellite Positioning System(s) (SPS) 106, a network 108, and a location server 110. MS 102 may be enabled to communicate with BS 104 over one or more wireless communication links. One or more of MS 102, BS 104, or location server 110 may be enabled to acquire SPS signals transmitted by various transmitting resources of SPS 106, and/or otherwise be enabled to support certain position determination processes associated with information available via SPS 106.

Although the representative devices in FIG. 1 are illustrated as being coupled by either wireless communication links or wired communication links it should be understood that in certain example implementations at least some the devices may be coupled together via one or more wired, fiber, and/or wireless communication link(s).

Unless specifically stated otherwise, as used herein, the term "location server" is intended to represent one or more devices and/or one or more specific apparatuses therein that is/are enabled to support, at least in part, such position determination processes. Thus, while illustrated as a separate device in the example shown in FIG. 1 that may communicate via network 108 and/or a BS 104 with MS 102, it should be understood that in other implementations a "location server" may be enabled to communicate directly and/or indirectly with MS 102 using one or more wired and/or one or more wireless communication links. Hence, in certain example implementations, a location server may take the form of and/ or otherwise operatively comprise one or more wireless transmitters, receivers, transceivers, one or more base stations, various wired and/or wireless network resources, one or more computing devices enabled as specific apparatuses, and/or other like computing and/or communication devices. With this in mind, where example references are made to a base station (BS) or a BS 104, it should be understood that such BS and/or BS 104 may comprise a "location server" as broadly defined herein. Accordingly, the terms base station (BS) and location server are used interchangeably. Further still, in messages requesting and/or providing BS capabilities, etc., it should be understood that such requested information and/or provided information may be associated with location server capabilities, etc.

MS 102 and/or BS 104 may be enabled to provide functionality, for example, through the use of various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as CDMA2000, Wideband-CDMA (W-CDMA), and so on. CDMA2000 includes IS-95, IS-2000, and IS-856 standards. A TDMA network may implement Global System for Communications (GSM), Digital Advanced Phone System (D-AMPS), or some other RAT. An OFDMA network may implement Long Term Evolution (LTE). GSM, W-CDMA and LTE are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN. As mentioned earlier, the techniques may be implemented for use with a UMB network, a HRPD network, a CDMA2000 1X network, GSM, WCDMA, LTE, and/or the like.

SPS 106 may, for example, include one or more of the Global Positioning System (GPS), a modernized GPS, Galileo, GLONASS, a Satellite Based Augmentation System (SBAS) (such as a Wide Area Augmentation System (WAAS), a European Geostationary Overlay Service (EGNOS), a Multi-functional Satellite Augmentation System (MSAS), a GPS Aided Geo Augmented Navigation (GAGAN), or the like), Quasi-Zenith Satellite System (QZSS), Compass/BeiDou, Indian Regional Navigational Satellite System (IRNSS), NAVSTAR, and/or other like GNSS, a system that uses satellites from a combination of these systems, or any SPS developed in the future, each referred to generally herein as a "Satellite Positioning System" (SPS).

Furthermore, the methods and apparatuses described herein may be used with position determination processes that utilize pseudolites or a combination of satellites and pseudolites. Pseudolites may include ground-based transmitters that broadcast a PN code or other ranging code (e.g., similar to a GPS or CDMA cellular signal) modulated on an L-band (or other frequency) carrier signal, which may be synchronized with SPS time. Each such transmitter may be assigned a unique PN code so as to permit identification by a remote receiver. Pseudolites may be used to augment an SPS, for example, in situations where some SPS signals from orbiting satellites might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

MS 102, in certain example implementations, may include a device such as a cellular or other wireless communication device, personal communication system (PCS) device, personal navigation device, a vehicle mountable navigation device, a tracking device, Personal Information Manager (PIM), Personal Digital Assistant (PDA), laptop or other suitable device which may be capable of receiving wireless communications.

The methodologies described herein may be implemented by various means depending upon the application. For example, these methodologies may be implemented in hardware, firmware, software, or a combination thereof. For a hardware implementation, one or more processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, certain methodologies may be implemented with modules (e.g., procedures, functions, and so on) that perform the functions described herein. Any machine readable medium tangibly embodying instructions may be used in implementing the methodologies described herein. For example, software codes may be stored in a memory of MS 102 and/or BS 104 and executed by a processing unit of the device. Memory may be implemented within a processing unit and/or external to the processing unit. As used herein the term "memory" refers to any type of long term, short term, volatile, nonvolatile, or other memory and is not to be limited to any particular type of memory or number of memories, or type of media upon which memory is stored.

If implemented in software, functions that implement methodologies or portions thereof may be stored on and/or transmitted over as one or more instructions or code on a computer-readable medium. A computer-readable medium may take the form of an article of manufacture. A computer-readable medium may include computer storage media and/or communication media including any medium that facilitates transfer of a computer program from one place to another. A storage media may be any available media that may be accessed by a computer or like device. By way of example but not limitation, a computer-readable medium may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing unit having a command set which includes the encoded commands. Such an instruction may be encoded in the form of a machine language understood by the processing unit. Again, these are merely examples of an instruction and claimed subject matter is not limited in this respect.

Figure 2:
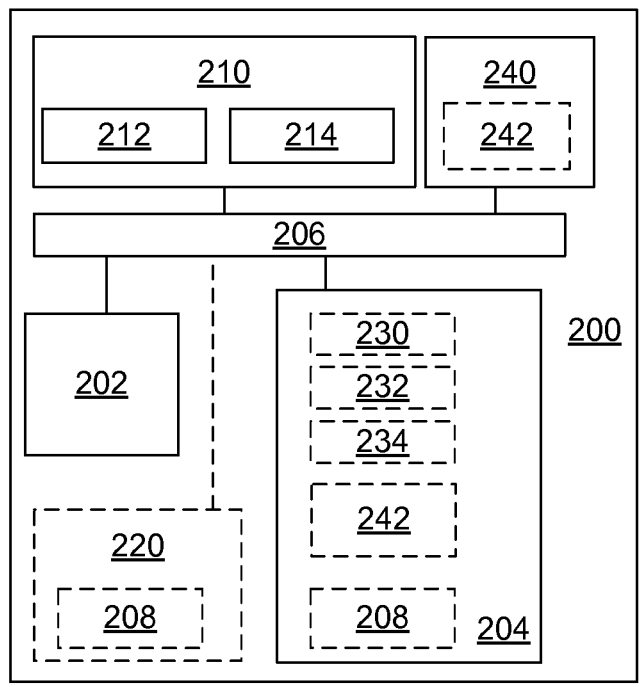
FIG. 2 is a schematic block diagram illustrating certain example features of a device that may be enabled to initiate and/or otherwise support a position determination process in accordance with an implementation.

Reference is now made to FIG. 2, which is a schematic block diagram illustrating certain example features of a specific apparatus 200 enabled to initiate and/or otherwise support a position determination process. Apparatus 200 may, for example, be implemented in some form within MS 102, BS 104, location server 110, and/or other like devices, as applicable, to perform or otherwise support at least a portion of the example techniques described herein.

Apparatus 200 may, for example, include one or more processing units 202, memory 204, a transceiver 210, and (optionally) an SPS receiver 240, which may be operatively coupled with one or more connections 206 (e.g., buses, lines, fibers, links, etc.). In certain example implementations, apparatus 200 may take the form of a chipset, and/or the like.

Processing unit 202 may be implemented in hardware, software, or a combination of hardware and software. Thus, for example, processing unit 202 may represent one or more circuits configurable to perform at least a portion of a data computing procedure or process related to the operation of device 200. By way of example but not limitation, processing unit 202 may include one or more processors, controllers, microprocessors, microcontrollers, application specific integrated circuits, digital signal processors, programmable logic devices, field programmable gate arrays, and the like, or any combination thereof.

Memory 204 may represent any data storage mechanism. Memory 204 may include, for example, a primary memory and/or a secondary memory. Primary memory may include, for example, a random access memory, read only memory, etc. While illustrated in this example as being separate from processing unit 202, it should be understood that all or part of a primary memory may be provided within or otherwise co-located/coupled with processing unit 202. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to, computer readable medium 220. As such, in certain example implementations, the methods and/or apparatuses presented herein may take the form in whole or part of a computer readable medium 220 that may include computer implementable instructions 208 stored thereon, which if executed by at least one processing unit 202 may be operatively enabled to perform all or portions of the example operations as described herein.

As illustrated in FIG. 2, memory 204 may also include instructions and/or data associated with one or more positioning protocol versions 230, a particular SPS related PDDM 232 (e.g., or assistance data IE, etc.), a "generic" SPS related PDDM 234 (e.g., or assistance data IE, etc.), and/or SPS related assistance data 242. As illustrated, all or portions of SPS related assistance data 242 may also be provided within or otherwise processed in some manner by SPS receiver 240. SPS receiver 240 may be enabled to receive electromagnetic signals associated with one or more SPS.

Transceiver 210 may, for example, include a transmitter 212 enabled to transmit one or more electromagnetic signals over one or more wireless communication links and a receiver 214 to receive one or more signals transmitted over one or more wireless communication links. In certain implementations, transceiver 210 may also support wired transmission and/or reception, e.g., when implemented within BS 104 and/or other like devices.

Figure 3:
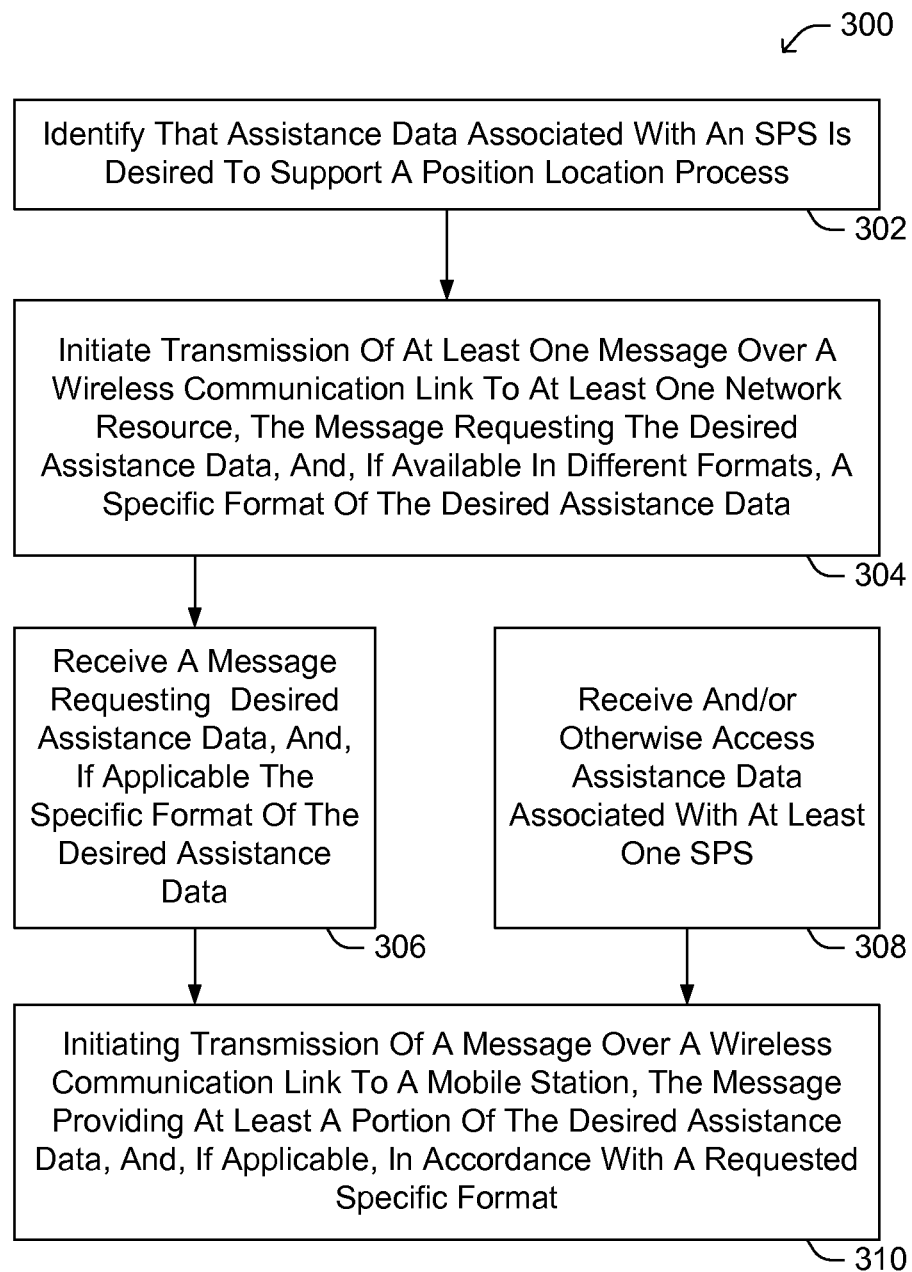
FIG. 3 is a flow-diagram illustrating an exemplary method that may be implemented in one or more devices to initiate and/or otherwise support a position determination process in accordance with an implementation.

Attention is drawn next to FIG. 3, which is a flow-diagram illustrating an exemplary method that may be implemented in wireless communication network environment 100 to support a position determination process and more particularly, to support devices in requesting and providing SPS related assistance data.

At block 302, a mobile station may identify that assistance data may be desired to support a position determination process. For example, a mobile station may determine that ephemeris and/or other data associated with an SPS may be missing, inaccurate, expired, etc. A mobile station may further identify that a particular (missing) assistance data (for example ephemeris and clock correction data) may be supported in multiple formats for a particular SPS. For example, GPS or QZSS ephemeris may be supported in NAV, CNAV, or CNAV-2 formats, and/or Almanac data may be supported in NAV Almanac, Reduced Almanac format or Midi Almanac format. A mobile station may determine that only one of these formats may be desired, or multiple formats may be desired.

At block 304, the mobile station may initiate transmission of at least one message (e.g., a PDDM) over a wireless communication link to at least one network resource (e.g., a base station, a location server, a PDE, etc.). The one or more messages may request all or part of the desired assistance data as identified at block 302. The one or more messages may also request that the desired assistance data be provided in one or more specific formats should such assistance data be available in two or more formats.

For example, a mobile station may include a "Navigation message type" indication field in a message which indicates in which navigation message format the data is desired. In an exemplary implementation, such may be done by defining a bit map with bit positions for each navigation message type. For example, bit 1 in a bit map may be assigned to NAV format, bit 2 may be assigned to CNAV format and bit 3 may be assigned to CNAV-2 format, or the like. A mobile station may set the corresponding bit to value 1 ('True') to indicate this particular format may be desired, and may set other bits to value 0 ('False') to indicate that this particular format may not desired or not needed.

At block 306, at least one network resource may receive all or part of the one or more messages as transmitted at block 302. Here, the one or more received messages request that all or part of the desired assistance data be provided, and should such assistance data be available in two or more formats, at least one desired format.

At block 308, at least one network resource may receive and/or otherwise operatively access all or part of the desired assistance data associated with at least one SPS.

At block 310, at least one network resource may initiate transmission of at least one message (e.g., a PDDM) over a wireless communication link to at least the mobile station. The one or more messages may provide all or part of the desired assistance data as identified initially at block 302 by the mobile station and subsequently at block 306 by the network resource, and/or received/accessed at block 308. Here, one or more messages may also provide the desired assistance data in a requested specific format should such assistance data be available in different formats. In certain implementations, a specific format may include assistance data that is in a native format as may, for example, be provided by an SPS. In certain implementations, a specific format may include assistance data that is in a non-native format, e.g., in a format that is not provided by an SPS.

By way of further example but not limitation, the example methods and apparatuses provided herein may allow for assistance data, such as ephemeris and almanac data to be requested and/or provided within a wireless network using a positioning protocol version supporting assisted-SPS/GNSS location processes. As mentioned, current location protocols, such as IS-801-A, RRLP, or RRC allow a location server to send ephemeris and almanac data to a mobile station (such as a wireless device, smart phone, or cellular phone), but only for the GPS constellation. Other SPS/GNSS constellations are either already available (e.g., GLONASS, SBAS (Satellite Based Augmentation Systems)), or are expected to be available in the near future (e.g., QZSS (Quasi-Zenith Satellite System)), etc. Furthermore, the GPS is expected to be modernized and new ephemeris and almanac data formats are also expected.

The methods and apparatuses provided herein may be implemented, for example, to allow for such varying types/formats of assistance data to be requested and/or provided over wireless network communication links.

One potential benefit may be that a negotiated positioning protocol version may support a plurality of different devices, SPS, assistance data, etc. Another potential benefit is that certain positioning protocol versions may support various different types of messages (e.g., PDDMs) and/or may support the use of generic message(s) that may be selectively enabled for use with a plurality of different types of SPS, assistance data, etc. Yet another potential benefit may be that the format of such assistance data may be native or non-native to the SPS and as such operating efficiency may be increased in a mobile station and/or network resource(s). For example, if a mobile station is operatively enabled to receive native formatted assistance data from an SPS, then receiving such assistance data in a native format via a wireless network may reduce the amount of processing that the mobile station may support. In other example implementations, it may be that additional benefits exist by providing assistance data to the mobile station in non-native format, for example, if a particular SPS does not support a certain type of model data. For example, as is the case with the current GLONASS SPS, which does not provide model data for ionospheric effects. Using GPS or Galileo, or other SPS model data for GLONASS may effectively overcome this limitation, since the GPS or Galileo ionospheric model data are "non-native" for the GLONASS SPS. Thus, certain example implementations may provide support within a positioning protocol version and/or associated position determination processes for different assistance data formats.

Figure 4:
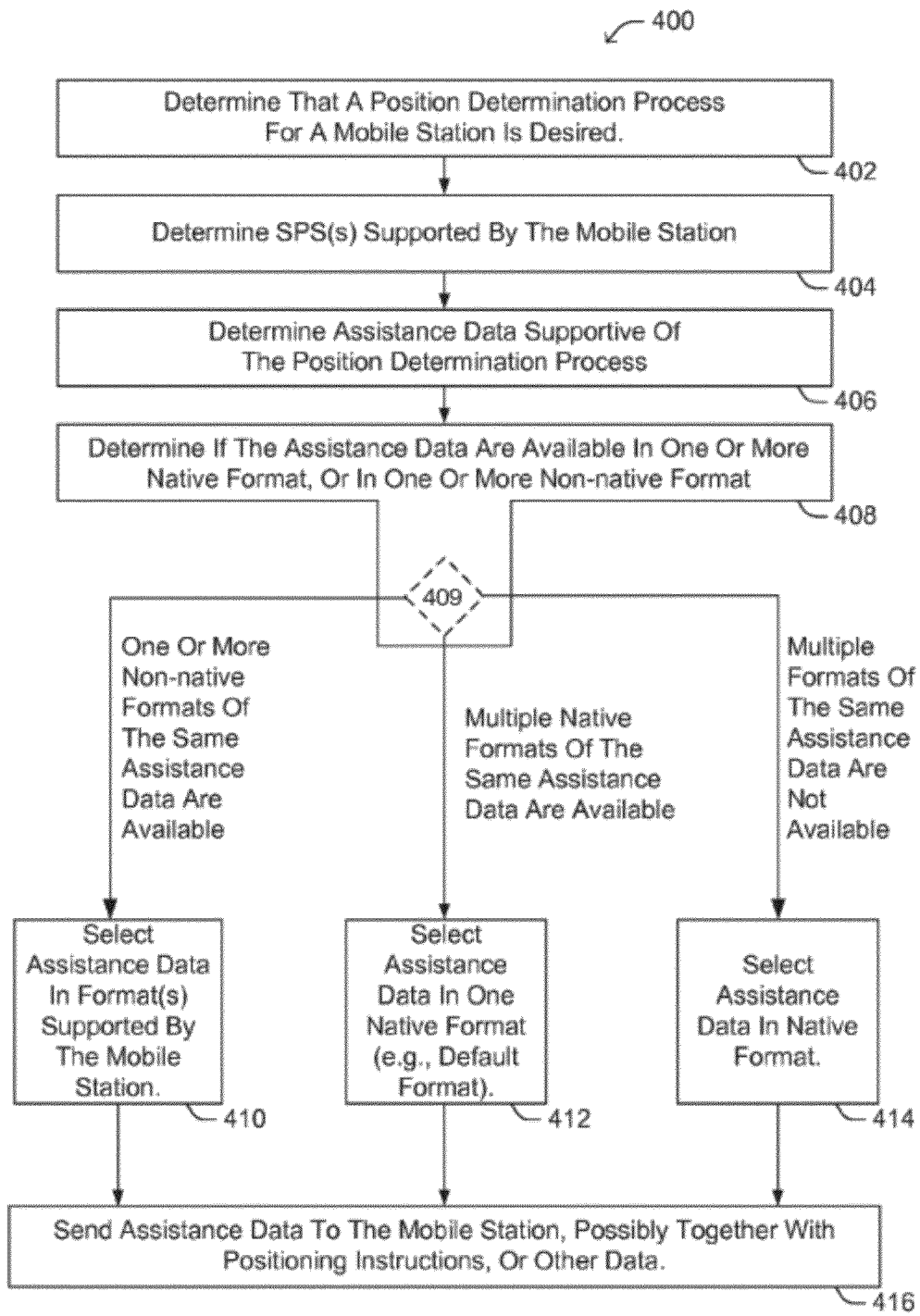
FIG. 4 is a flow-diagram illustrating yet another exemplary method that may be implemented in one or more devices and/or location servers to initiate and/or otherwise support a position determination process in accordance with an implementation.

Attention is drawn next to FIG. 4, which is a flow-diagram illustrating yet another exemplary method that may be implemented in wireless communication network environment 100 to support a position determination process.

At block 402, a network resource may determine that a position determination process may be desired to locate a mobile station. At block 404, a network resource may determine which particular SPS or SPSs the mobile station supports. This information may, for example, be provided by the mobile station via one or more mobile station capability or other like messages prior to a location request, e.g., during registration in the network, or the like. In certain implementations, this information may be stored in subscriber databases and/or the like within the network.

At block 406, a network resource may determine the assistance data to be provided to the mobile station in a location request or assistance data delivery message. For example, in certain implementations, the assistance date may indicate visible satellites at a given time (e.g., current time) at a coarse location estimate for the mobile station.

At block 408, a network resource may determine if such assistance data is available in one or more native formats, such as NAV, CNAV, or CNAV-2, etc., formats, and/or in one or more non-native formats. The process then proceeds from block 409 to subsequent blocks, depending on availability of various formats of assistance data.

If one or more non-native formats of the same assistance data are available, a network resource may determine, at block 408, which format or format choices are supported by the mobile station for this particular assistance data element and/or SPS. Information to make the determination may, for example, have been provided by the mobile station in one or more mobile station capability messages prior to the location request, such as a RRLP Position Capability Request/Response message, or the like.

If multiple native formats of the same assistance data are available, a network resource may determine, at block 408, which native format choice to provide to the mobile station. This determination may, for example, be based on information provided by the mobile station in one or more mobile station capability messages prior to the location request, such as a RRLP Position Capability Request/Response message or the like, and/or on some pre-defined default assistance data format.

If multiple formats of the same assistance data are not available, a network resource may determine, at block 408, that native formatted assistance data is to be provided. In most implementations it is expected that a mobile station will at least be receptive of application native formatted assistance data for each supported SPS, for example, to support a non-assisted, standalone mode of operation.

At one of blocks 410, 412, or 414, the applicable formatted assistance data is selected. At block 416, a network resource initiates transmission of at least one message (e.g., a PDDM, a RRLP Measure Position Request, a RRLP Assistance Data Delivery, a RRC Measurement Control, a RRC Assistance Data Delivery, or the like) over a wireless communication link to the mobile station.

Figure 5:
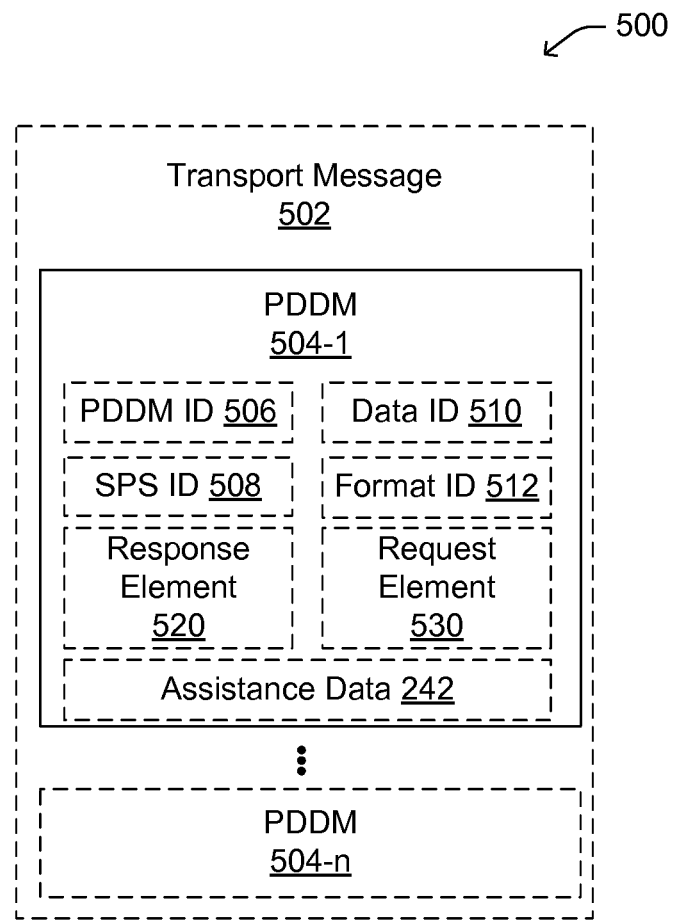
FIG. 5 is a block diagram illustratively depicting certain exemplary information that may be included in messages transmitted between/among certain devices to initiate and/or otherwise support a position determination process in accordance with an implementation.

Attention is drawn next to FIG. 5, which is a block diagram illustratively depicting some of the information and/or data fields that may be provided in certain example message within wireless communication network environment 100. As mentioned previously, as part of positioning protocol version a mobile station (MS), base station (BS) and/or other network resource may transmit one or more PDDMs 504-1, . . ., 504-n, e.g., via one or more transport layer messages 502.

As illustrated in FIG. 5, for example, PDDM 504-1 may include at least one response element 520 and/or at least one request element 530 in accordance with a positioning protocol version. Some example response and request elements are presented in subsequent sections.

In some example implementations, a PDDM may include (optional) information in one or more data fields that identifies in some manner the PDDM (e.g., data field 506), an SPS (e.g., data field 508), the assistance data (e.g., data field 510), and/or a format of the assistance data (e.g., data field 512). A PDDM may include assistance data 242, and/or other information in the form of data/data signals.

By way of example but not limitation, in a positioning protocol version such as IS-801-B and/or the like, request elements transmitted by a MS may include one or more of the following: a Request Location Response, a Request BS Capabilities, a Request Base Station Almanac, a Request GPS Acquisition Assistance, Request GPS Sensitivity Assistance, a Request GPS Location Assistance, Request GPS Almanac, a Request GPS Ephemeris, a Request GPS Navigation Message Bits, a Request GPS Almanac Correction, a Request GPS Satellite Health Information, a Request Extended Location Response, a Request Extended BS Capabilities, a Request Enhanced Base Station Almanac, a Request General Acquisition Assistance, a Request Extended GPS Sensitivity Assistance, a Request GPS Almanac v1, a Request Extended GPS Ephemeris, a Request Extended GPS Navigation Message Bits, a Request Extended GPS Almanac Correction, a Request Extended GPS Satellite Health Information, a Request GPS Coarse Location Assistance, a Request GPS Coarse Acquisition Assistance, a Request DGPS Assistance, a Request GPS Real-Time Integrity Information, a Request Advanced Location Response, a Request Advanced BS Capabilities, a Request Advanced UMB Base Station Almanac, a Request Advanced HRPD Base Station Almanac, a Request Advanced 1X Base Station Almanac, a Request GNSS Acquisition Assistance, a Request GNSS Sensitivity Assistance, a Request Modernized GPS Ephemeris and Clock Correction, a Request QZSS Ephemeris and Clock Correction, a Request GLONASS Ephemeris and Clock Correction, a Request Galileo Ephemeris and Clock Correction, a Request GEO Navigation Message Parameters, a Request Modernized GPS Almanac, a Request QZSS Almanac, a Request GLONASS Almanac, a Request Galileo Almanac, a Request GEO Almanacs Message Parameters, a Request GPS Ionospheric Model, a Request GALILEO Ionospheric Model, a Request QZSS Ionospheric Model, a Request GNSS-GNSS Time Offset, a Request GPS UTC Model, a Request Advanced GNSS Satellite Health Information, and/or a Request DGNSS Assistance.

Also by way of example but not limitation, as part of IS-801-B, response elements transmitted by a MS may include one or more of the following: a Reject, a Provide Location Response, Provide MS Information, a Provide Autonomous Measurement Weighting Factors, a Provide Pseudorange Measurement, a Provide Pilot Phase Measurement, a Provide Time Offset Measurement, a Provide Cancellation Acknowledgement, am Extended Reject, a Provide Extended Location Response, a Provide Extended MS Information; a Provide Autonomous Measurement Weighting Factors v1, a Provide General Location Measurement, a Provide Extended Cancellation Acknowledgement, a Provide GPS Coarse Location Response, a Provide Messaging Delay Measurement, a Provide Bearing Measurement, a Provide Serving System Information, an Advanced Reject, a Provide Advanced Location Response, a Provide Advanced MS Information, a Provide UMB Pilot Time Offset Measurement, a Provide HRPD Pilot Phase Measurement, a Provide GNSS Pseudorange Measurement, a Provide Advanced Cancellation Acknowledgement, and/or a Provide Advanced System Parameters Information.

By way of further example but not limitation, as part of IS-801-B request elements received by a MS may include one or more of the following: a Request Location Response, a Request MS Information, a Request Autonomous Measurement Weighting Factors, a Request Pseudorange Measurement, a Request Pilot Phase Measurement, a Request Time Offset Measurement, a Request Cancellation, a Request Extended Location Response, a Request Extended MS Information, a Request Autonomous Measurement Weighting Factors v1, a Request General Location Measurement, a Request Extended Cancellation, a Request GPS Coarse Location Response, a Request Messaging Delay Measurement, a Request Bearing Measurement, a Request Serving System Information, a Request Advanced Location Response, a Request Advanced MS Information, a Request UMB Pilot Time Offset Measurement, a Request HRPD Pilot Phase Measurement, a Request GNSS Pseudorange Measurement, a Request Advanced Cancellation, and/or a Request Advanced System Parameters Information.

By way of further example but not limitation, as part of IS-801-B response elements received by a MS may include one or more of the following: a Reject, a Provide Location Response, a Provide BS Capabilities, a Provide Base Station Almanac, a Provide GPS Acquisition Assistance, a Provide GPS Sensitivity Assistance, a Provide GPS Location Assistance—Spherical Coordinates, a Provide GPS Location Assistance—Cartesian Coordinates, a Provide GPS Almanac, a Provide GPS Ephemeris, a Provide GPS Navigation Message Bits, a Provide GPS Almanac Correction, a Provide GPS Satellite Health Information, an Extended Reject, a Provide Extended Location Response, a Provide Extended BS Capabilities, a Provide Enhanced Base Station Almanac, a Provide General Acquisition Assistance, a Provide Extended GPS Sensitivity Assistance, a Provide GPS Almanac v1, a Provide Extended GPS Ephemeris, a Provide Extended GPS Navigation Message Bits, a Provide Extended GPS Almanac Correction, a Provide Extended GPS Satellite Health Information, a Provide GPS Coarse Location Assistance, a Provide GPS Coarse Acquisition Assistance, a Provide DGPS Assistance, a Provide GPS Real-Time Integrity Information, an Advanced Reject, a Provide Advanced Location Response, a Provide Advanced BS Capabilities, a Provide Advanced UMB Base Station Almanac, a Provide Advanced HRPD Base Station Almanac, a Provide Advanced 1X Base Station Almanac, a Provide GNSS Acquisition Assistance, a Provide GNSS Sensitivity Assistance, a Provide Modernized GPS Ephemeris and Clock Correction, a Provide QZSS Ephemeris and Clock Correction, a Provide GLONASS Ephemeris and Clock Correction, a Provide Galileo Ephemeris and Clock Correction, a Provide GEO Navigation Message Parameters, a Provide Modernized GPS Almanac, a Provide QZSS Almanac, a Provide GLONASS Almanac, a Provide Galileo Almanac, a Provide GEO Almanacs Message Parameters, a Provide GPS Ionospheric Model, a Provide GALILEO Ionospheric Model, a Provide QZSS Ionospheric Model, a Provide GNSS-GNSS Time Offset, a Provide GPS UTC Model, a Provide Advanced GNSS Satellite Health Information, and/or a Provide DGNSS Assistance.

Thus, as illustrated by the above example a variety of request and response elements may be supported within the PDDMs defined by a positioning protocol version.

Figure 6:
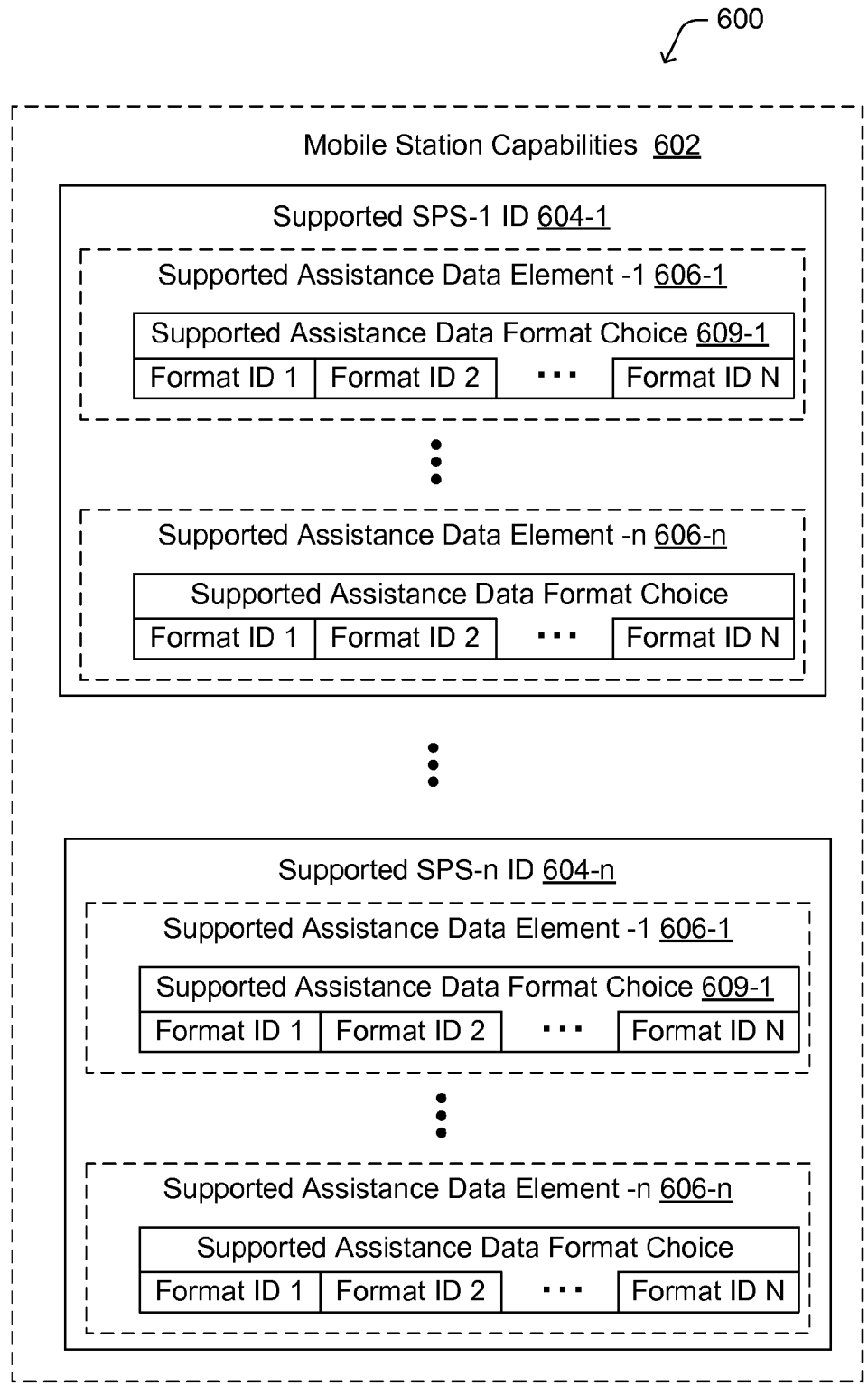
FIG. 6 is a block diagram illustratively depicting certain exemplary information that may be included in mobile station capability messages transmitted between/among certain devices to support a position determination process in accordance with an implementation.

Attention is drawn next to FIG. 6, which is a block diagram illustratively depicting some of the information and/or data fields that may be provided in certain example mobile station capability messages within wireless communication network 100.

As mentioned previously, many new data formats may be defined or available for new SPSs, and therefore, multiple native or non-native formatted combinations of assistance data may be possible. However, a mobile station may not be able to support all possible combinations. In order to avoid sending assistance data information in formats not supported by a mobile station, new enhanced mobile station capabilities may be provided which may, for example, include specific information about supported assistance data choices for each supported SPS.

As illustrated in FIG. 6, for example, a mobile station capability element 602 may include information about each supported SPS, identified by a particular SPS ID 604-1. For each supported SPS ID, information of which specific assistance data element is supported may be provided by a supported assistance data element 606-1. If an assistance data element may have multiple format choices, a format choice indicator 609-1 may included. As shown in this example implementation, a bit map of N Format IDs is defined where one bit per model or format may be used to indicate support or non-support for a particular assistance data format or choice. This could be done by defining a one value as support, and a zero value of non-support, for example. Here, for example, for each supported SPS, an element 604-1, 604-2, . . . , 604-*n* may be included in the mobile station capability message. For each SPS 604-*n*, one assistance data element 606-1, 606-2, . . . , 606-*n* may be included, each indicating support for a particular assistance data type.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it may be intended that claimed subject matter not be limited to the particular examples disclosed, but that such claimed subject matter may also include all aspects falling within the scope of appended claims, and equivalents thereof.

What is claimed is:

1. A method in a mobile station, the method comprising: identifying requested assistance data associated with a Satellite Positioning System (SPS) used by said mobile station, wherein the requested assistance data support a position determination process at the mobile station based, at least in part, on received SPS signals; and
transmitting electromagnetic signals representing at least one message over a wireless communication link to at least one network resource, said at least one message comprising at least one element identifying said requested assistance data and a specific format of said requested assistance data, wherein said requested assistance data is available in a plurality of formats.

2. The method as recited in claim 1, wherein said at least one message is associated with only said SPS.

3. The method as recited in claim 2, wherein said at least one message comprises a data field that identifies said specific format.

4. The method as recited in claim 1, wherein said at least one message comprises a single message that is selectively associated with one of a plurality of SPS using a first data field that identifies said SPS.

5. The method as recited in claim 4, wherein said single message comprises a second data field identifying said specific format.

6. The method as recited in claim 1, wherein said SPS comprises at least one Global Navigation Satellite System (GNSS).

7. The method as recited in claim 6, wherein said at least one GNSS comprises at least one of Galileo, GLONASS, Satellite Based Augmentation System (SBAS), Quasi-Zenith Satellite System (QZSS), or modernized Global Positioning System (GPS).

8. The method as recited in claim 1, wherein the requested assistance data comprises at least one of ephemeris data, almanac data, model data, timing data, or health data.

9. The method as recited in claim 1, wherein said specific format of said requested assistance data comprises a native format or a non-native format.

10. The method as recited in claim 1, wherein said at least one element comprises at least one of a request element or a response element, and wherein said at least one element is compliant with at least one of a Telecommunications Industry Association (TIA) IS-801-B standard or an associated Third-Generation Partnership Project 2 (3GPP2) standard.

11. An apparatus within a mobile station, the apparatus comprising:
means for identifying requested assistance data associated with a Satellite Positioning System (SPS) used by said mobile station, wherein the requested assistance data support a position determination process at the mobile station based, at least in part, on received SPS signals; and
means for transmitting electromagnetic signals representing at least one message over a wireless communication link to at least one network resource, said at least one message comprising at least one element identifying said requested assistance data and a specific format of said requested assistance data, wherein said requested assistance data is available in a plurality of formats.

12. The apparatus as recited in claim 11, wherein said at least one message is associated with only said SPS.

13. The apparatus as recited in claim 12, wherein said at least one message comprises a data field that identifies said specific format.

14. The apparatus as recited in claim 11, wherein said at least one message comprises a single message that is selectively associated with one of a plurality of SPS using a first data field that identifies said SPS.

15. The apparatus as recited in claim 14, wherein said single message comprises a second data field identifying said specific format.

16. The apparatus as recited in claim 11, wherein said SPS comprises at least one Global Navigation Satellite System (GNSS).

17. The apparatus as recited in claim 16, wherein said at least one GNSS comprises at least one of Galileo, GLONASS, Satellite Based Augmentation System (SBAS), Quasi-Zenith Satellite System (QZSS), or modernized Global Positioning System (GPS).

18. The apparatus as recited in claim 11, wherein the requested assistance data comprises at least one of ephemeris data, almanac data, model data, timing data, or health data.

19. The apparatus as recited in claim 11, wherein said specific format of said requested assistance data comprises a native format or a non-native format.

20. The apparatus as recited in claim 11, wherein said at least one element comprises at least one of a request element or a response element, and wherein said at least one element is compliant with at least one of a Telecommunications Industry Association (TIA) IS-801-B standard or an associated Third-Generation Partnership Project 2 (3GPP2) standard.

21. A mobile station comprising:
at least one receiver operatively enabled to receive electromagnetic signals associated with a Satellite Positioning System (SPS);
at least one wireless transceiver; and
at least one processing unit operatively coupled to said receiver and said wireless transceiver and being operatively enabled to:
identify requested assistance data associated with said SPS used by said mobile station, wherein the requested assistance data support a position determination process based, at least in part, on said received electromagnetic signals associated with said SPS; and initiate transmission of electromagnetic signals representing at least one message over a wireless communication link to at least one network resource using said wireless transceiver, said at least one message comprising at least one element identifying said requested assistance data and a specific format of said requested assistance data, wherein said requested assistance data is available in a plurality of formats.

22. The mobile station as recited in claim 21, wherein said at least one message is associated with only said SPS.

23. The mobile station as recited in claim 22, wherein said at least one message comprises a data field that identifies said specific format.

24. The mobile station as recited in claim 21, wherein said at least one message comprises a single message that is selectively associated with one of a plurality of SPS using a first data field that identifies said SPS.

25. The mobile station as recited in claim 24, wherein said single message comprises a second data field identifying said specific format.

26. The mobile station as recited in claim 21, wherein said SPS comprises at least one Global Navigation Satellite System (GNSS).

27. The mobile station as recited in claim 26, wherein said at least one GNSS comprises at least one of Galileo, GLONASS, Satellite Based Augmentation System (SBAS), Quasi-Zenith Satellite System (QZSS), or modernized Global Positioning System (GPS).

28. The mobile station as recited in claim 21, wherein the requested assistance data comprises at least one of ephemeris data, almanac data, model data, timing data, or health data.

29. The mobile station as recited in claim 21, wherein said specific format of said requested assistance data comprises a native format or a non-native format.

30. The mobile station as recited in claim 21, wherein said at least one element comprises at least one of a request element or a response element, and wherein said at least one element is compliant with at least one of a Telecommunications Industry Association (TIA) IS-801-B standard or an associated Third-Generation Partnership Project 2 (3GPP2) standard.

31. An article comprising:
a non-transitory computer readable medium having computer implementable instructions stored thereon which if implemented by one or more processing units in a mobile station operatively enable the mobile station to:

as part of a position determination process, identify requested assistance data associated with a Satellite Positioning System (SPS) used by said mobile station, wherein the requested assistance data support a position determination process at the mobile station based, at least in part, on received SPS signals; and initiate transmission of electromagnetic signals representing at least one message over a wireless communication link to at least one network resource, said at least one message comprising at least one element identifying said requested assistance data and a specific format of said requested assistance data, wherein said requested assistance data is available in a plurality of formats.

32. The article as recited in claim 31, wherein said at least one message is associated with only said SPS.

33. The article as recited in claim 32, wherein said at least one message comprises a data field that identifies said specific format.

34. The article as recited in claim 31, wherein said at least one message comprises a single message that is selectively associated with one of a plurality of SPS using a first data field that identifies said SPS.

35. The article as recited in claim 34, wherein said single message comprises a second data field identifying said specific format.

36. The article as recited in claim 31, wherein said SPS comprises at least one Global Navigation Satellite System (GNSS).

37. The article as recited in claim 36, wherein said at least one GNSS comprises at least one of Galileo, GLONASS, Satellite Based Augmentation System (SBAS), Quasi-Zenith Satellite System (QZSS), or modernized Global Positioning System (GPS).

38. The article as recited in claim 31, wherein the requested assistance data comprises at least one of ephemeris data, almanac data, model data, timing data, or health data.

39. The article as recited in claim 31, wherein said specific format of said requested assistance data comprises a native format or a non-native format.

40. The article as recited in claim 31, wherein said at least one element comprises at least one of a request element or a response element, and wherein said at least one element is compliant with at least one of a Telecommunications Industry Association (TIA) IS-801-B standard or an associated Third-Generation Partnership Project 2 (3GPP2) standard.

* * * * *